United States Patent
Grion (10) Patent No.: US 7,800,977 B2
(45) Date of Patent: Sep. 21, 2010

(54) PRE-STACK COMBINING OF OVER/UNDER SEISMIC DATA

(75) Inventor: Sergio Grion, Redhill (GB)

(73) Assignee: WesternGeco L.L.C., Houston, TX (US)

(*) Notice: Subject to any disclaimer, the term of this patent is extended or adjusted under 35 U.S.C. 154(b) by 279 days.

(21) Appl. No.: 10/858,968

(22) Filed: Jun. 1, 2004

(65) Prior Publication Data

US 2005/0265122 A1    Dec. 1, 2005

(51) Int. Cl.
*G01V 1/38*    (2006.01)

(52) U.S. Cl. .......................... 367/24; 367/21

(58) Field of Classification Search ............ 367/20–24, 367/15; 181/110
See application file for complete search history.

(56) References Cited

U.S. PATENT DOCUMENTS

| | | | | |
|---|---|---|---|---|
| 4,752,916 A * | 6/1988 | Loewenthal | ................. | 367/24 |
| 4,937,793 A * | 6/1990 | Shuck et al. | ................. | 367/24 |
| 5,148,406 A * | 9/1992 | Brink et al. | ................. | 367/22 |
| 5,193,077 A * | 3/1993 | Weiglein et al. | .............. | 367/23 |
| 5,306,472 A | 4/1994 | Sano et al. | ................. | 422/211 |
| 5,583,825 A | 12/1996 | Carrazzone et al. | .......... | 367/31 |
| 6,151,275 A * | 11/2000 | Starr | ......................... | 367/57 |
| 6,493,636 B1 * | 12/2002 | DeKok | ....................... | 702/17 |
| 6,654,693 B2 | 11/2003 | Sen et al. | ..................... | 702/17 |
| 6,718,265 B2 | 4/2004 | Herron et al. | .................. | 702/8 |
| 6,775,618 B1 * | 8/2004 | Robertsson et al. | .......... | 702/14 |
| 6,917,564 B2 | 7/2005 | Leaney | ........................ | 367/73 |
| 7,319,636 B2 | 1/2008 | Robertsson et al. | .......... | 367/21 |
| 7,328,108 B2 | 2/2008 | Robertsson et al. | .......... | 702/17 |
| 7,386,397 B2 * | 6/2008 | Amundsen et al. | ........... | 702/14 |
| 7,558,154 B2 | 7/2009 | Van Manen et al. | .......... | 367/43 |
| 2002/0118602 A1 | 8/2002 | Sen et al. | .................... | 367/151 |
| 2002/0156583 A1 | 10/2002 | Sen et al. | ..................... | 702/17 |
| 2004/0008578 A1 | 1/2004 | Leaney | ........................ | 367/15 |
| 2006/0203611 A1 | 9/2006 | Robertsson et al. | .......... | 367/13 |
| 2006/0253256 A1 | 11/2006 | Robertsson et al. | .......... | 702/14 |
| 2007/0002688 A1 | 1/2007 | Van Manen et al. | .......... | 367/14 |
| 2008/0294347 A1 | 11/2008 | Robertsson et al. | .......... | 702/17 |

OTHER PUBLICATIONS

Brink, M., "Application of Vertical Receiver Arrays in 3-D Seismic Exploration" *GECO A.S.*,Norway (1987).
Posthumus, B.J., "Deghosting Using a Twin Streamer Configuration," *Geophysical Prospecting* 41, 267-286 (1993).
Monk, D., "Wavefield Separation of Twin Streamer Data," *First Break* vol. 8, No. 3, Mar. 1990.
Singh et al., "Broadband Receiver Response from Dual-Streamer Data and Applications in Deep Reflection Seismology" *Geophysics*, vol. 61, No. 1, pp. 232-243 (Jan.-Feb. 1996).

(Continued)

*Primary Examiner*—Mark Hellner (57) ABSTRACT

The present invention provides a method for pre-stack combining of over/under seismic data. The method includes determining a calibration filter using a first pre-stack marine seismic data set acquired at a first depth and a second pre-stack marine seismic data set acquired at a second depth, wherein the second depth is greater than the first depth and determining a third data set based upon the first pre-stack marine seismic data set, the second pre-stack marine seismic data set, and the calibration filter.

19 Claims, 5 Drawing Sheets

OTHER PUBLICATIONS

Bittleston et al., "Marine Seismic Cable Steering and Control" *EAGE 62nd Conference and Technical Exhibition* Glasgow, Scotland, May 29-Jun. 2, 2000.

Grion et al., "Good Data in Bad Weather: Can Quantity Make Up for Quality?" *SEG* 2000 *Expanded Abstracts* (2000).

Vaughn et al., "Dual-Sensor Summation of Noisy Ocean-Bottom Data" *ACQ*-1.8.

Soubaras, Robert, "Ocean Bottom Hydrophone and Geophone Processing" *ACQ* 1.7 (1996).

Lokshtanov, Dmitri "Suppression of Free-Surface Effects from Multicomponent Sea-Floor Data" *Eagle 62nd Conference and Technical Exhibition* —Glasgow, Scotland, May 29-Jun. 2, 2000.

Grion et al., "Over/Under Acquisition—Breaking the Resolution Limits" *Eage 63rd Conference & Technical Exhibition* —Amsterdam, The Netherlands, Jun. 11-15, 2001.

Sønneland et al., "2-D Deghosting Using Vertical Receiver Arrays" Presented at the 47th EAEG Meeting, Budapest 1985.

\* cited by examiner

PRE-STACK COMBINING OF OVER/UNDER SEISMIC DATA

BACKGROUND OF THE INVENTION

1. Field of the Invention

This invention relates generally to marine seismic surveying, and, more particularly, to pre-stack combining of over/under seismic data acquired in a marine seismic survey.

2. Description of the Related Art

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, such as the exemplary survey 100 conceptually illustrated in FIG. 1, marine seismic streamers 105(1) or alternatively 105(2) are towed behind a survey vessel 110. The seismic streamers 105(1-2) may be several thousand meters long and contain a large number of sensors 115, such as hydrophones and associated electronic equipment, which are distributed along the length of the each seismic streamer cable 105(1-5). The survey vessel 110 also includes one or more seismic sources 120, such as airguns and the like.

Figure 1:
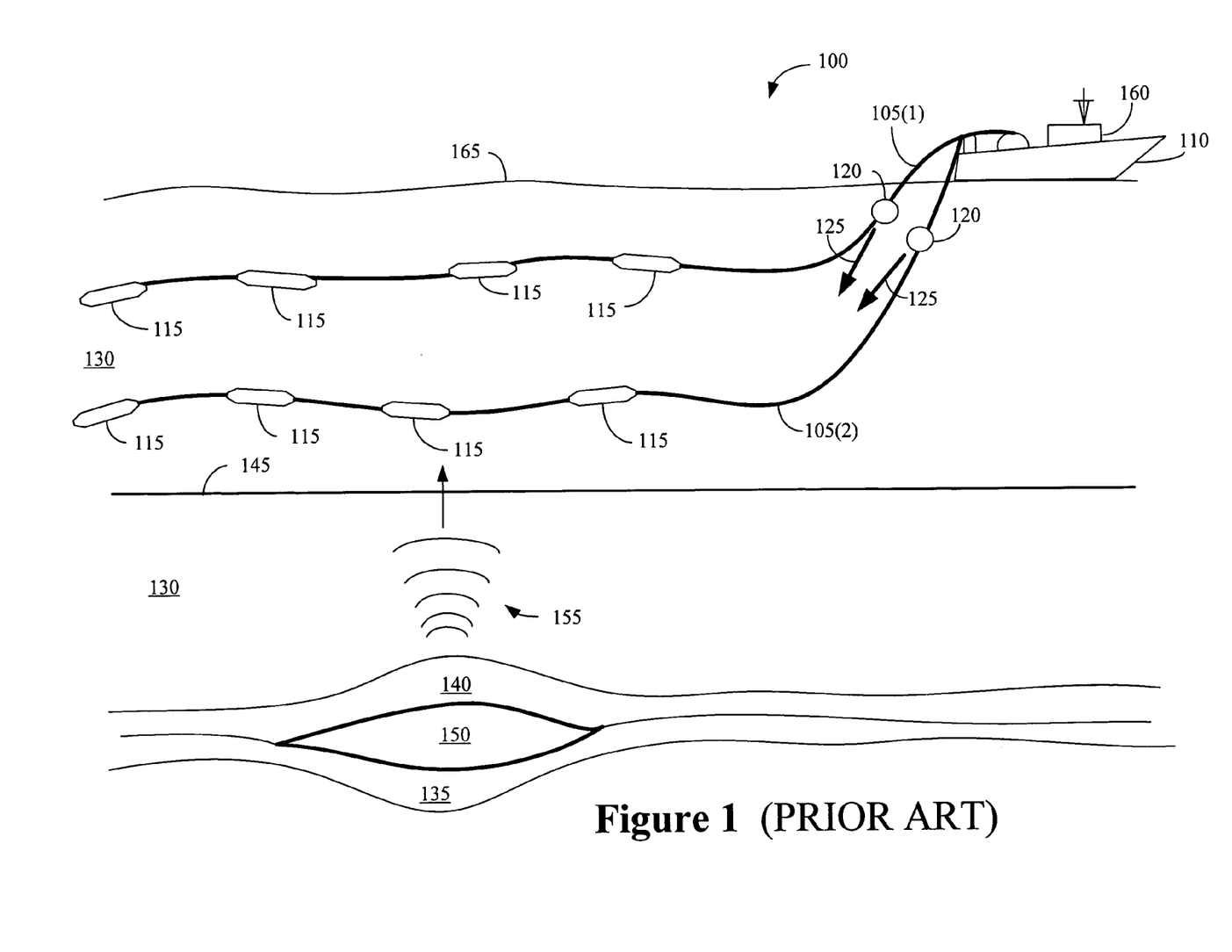
FIG. 1 conceptually illustrates a conventional marine seismic survey system.

As the streamers 105(1) or 105(2) are towed behind the survey vessel 110, acoustic signals 125, commonly referred to as "shots," produced by the seismic source 120 are directed down through the water column 130 into strata 135, 140 beneath a water bottom surface 145, where they are reflected from the various subterranean geological formations 150. Reflected signals 155 are received by the sensors 115 in the seismic streamer cables 105(1-2), digitized, and then transmitted to the survey vessel 110. The digitized signals are referred to as "traces" and are recorded and at least partially processed by a signal processing unit 160 deployed on the survey vessel 110. The ultimate aim of this process is to build up a representation of the subterranean geological formations 150 beneath the streamers 105(1-2). Analysis of the representation may indicate probable locations of hydrocarbon deposits in the subterranean geological formations 150.

During a marine seismic survey, the high-frequency content of the acquired seismic data may be increased by deploying the streamer 105(1) at a shallow depth relative to a surface 165 of the water column 130. However, the low-frequency content of the acquired seismic data, which may be important for stratigraphic and/or structural inversion, may be attenuated when the streamer 105(1) is deployed at the shallow depth. Thus, the low-frequency content of the acquired seismic data may be enhanced by alternatively deploying the streamer 105(2) further beneath the surface 165. However, this approach enhances the low-frequency content at the expense of the high-frequency content of the seismic data.

Some of the advantages of deploying the streamer 105(1) at the shallow depth and some of the advantages of deploying the streamer 105(2) at a greater depth may be realized in a marine seismic survey that includes both the streamer 105(1) deployed at the shallow depth and the streamer 105(2) deployed at the greater depth, as shown in FIG. 1. For example, the streamer 105(1) may be deployed at a depth of 6 meters and the streamer 105(2) may be deployed at a depth of 9 meters. This arrangement of the streamers 105 (1-2) is sometimes referred to as an over/under combination of the streamers 105(1-2). The term "over" is typically associated with the shallow streamer 105(1) and the term "under" is typically associated with the deep streamer 105(2). The over/under combination technique is also known as a dual-streamer de-ghosting technique, an acoustic wave field decomposition, and the like. Moreover, the vertically-separated seismic sensors 115 may be referred to as a vertical receiver array.

Figure 2:
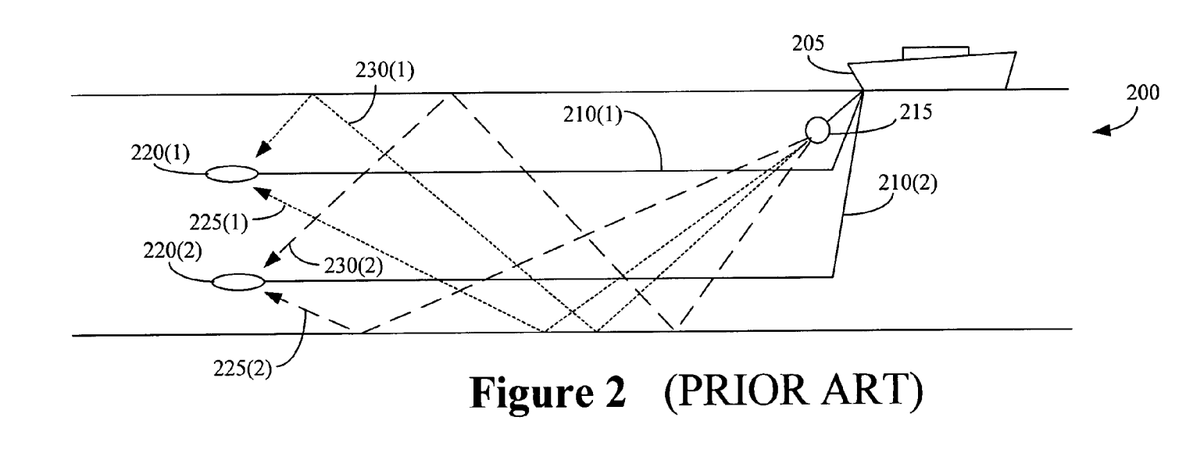
FIG. 2 conceptually illustrates a conventional system that may be used to perform a marine seismic survey using an over/under combination technique.

FIG. 2 conceptually illustrates a conventional system 200 that may be used to perform a marine seismic survey using an over/under combination technique. The system 200 includes a survey vessel 205, which tows a shallow streamer 210(1) and a deep streamer 210(2). The shallow and deep streamers 210(1-2) each include at least one receiver 220(1-2). A source 215 provides a seismic signal 225 that is received by receivers 220(1-2). As indicated in FIG. 2, the source 215 is typically deployed at a different depth than the receivers 220(1-2). One or more ghost signals 230(1-2) are also received by the receivers 220(1-2). Thus, seismic data acquired by the receivers 220(1-2) includes contributions from at least the seismic signal 225(1-2) and the one or more ghost signals 230(1-2).

Figure 3A:
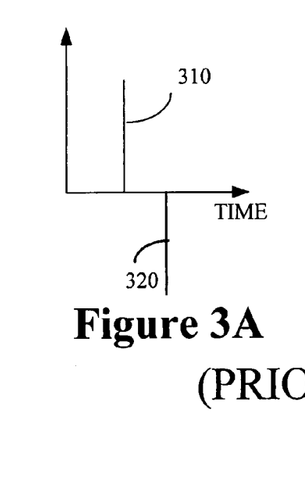
FIGS. 3A and 3B conceptually illustrate a seismic signal that may be received by a source on a shallow (over) streamer as a function of time and as a function of frequency, respectively.
Figure 3B:
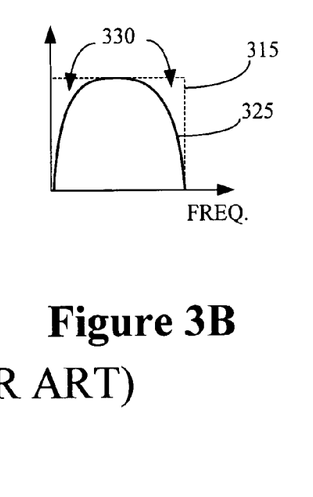

FIGS. 3A-D conceptually illustrate received seismic signals. In particular, FIGS. 3A and 3B conceptually illustrate a seismic signal that may be received by the shallow streamer 210(1) as a function of time (in FIG. 3A) and as a function of frequency (in FIG. 3B). As shown in FIG. 3A, the seismic signal includes an up-going wave field 310, which is approximately a delta-function corresponding to a flat amplitude spectrum seismic signal 315 in the frequency domain shown in FIG. 3B. A down-going wave field 320, corresponding to a ghost signal, is depicted in FIG. 3A as an approximate delta function with a negative amplitude that arrives at a later time than the up-going wave field 310. The "over" recorded seismic data 325 acquired by the shallow streamer 210(1) is a combination of the up-going wave field 310 and the down-going wave field 320. Accordingly, the "over" recorded seismic data 325 may include one or more notches 330 that may not be present in the flat amplitude spectrum seismic signal 315.

Figure 3C:
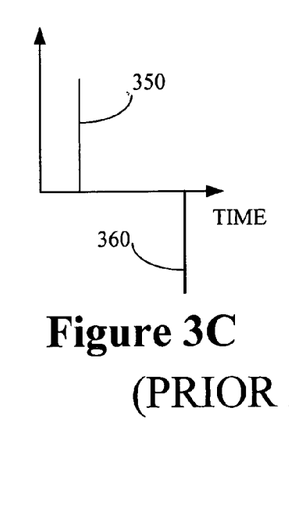
FIGS. 3C and 3D conceptually illustrate a seismic signal that may be received by a source on a deep (under) streamer as a function of time and as a function of frequency, respectively.
Figure 3D:
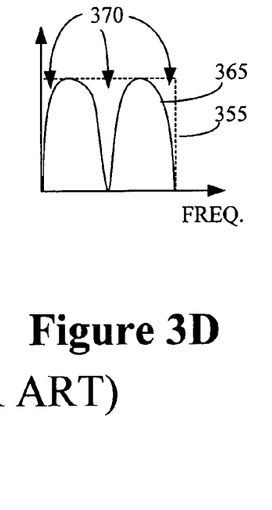

FIGS. 3C and 3D conceptually illustrate a seismic signal that may be received by the deep streamer 210(2) as a function of time (in FIG. 3C) and as a function of frequency (in FIG. 3D). As shown in FIG. 3C, the seismic signal includes an up-going wave field 350, which is approximately a delta-function corresponding to a flat amplitude spectrum seismic signal 355 in the frequency domain shown in FIG. 3D, and a down-going wave field 360, corresponding to a ghost signal, which is depicted in FIG. 3C as an approximate delta function with a negative amplitude that arrives at a later time than the up-going wave field 350. The "under" recorded seismic data 365 acquired by the source 215(2) on the deep streamer 210(2) includes one or more notches 370 that may not be present in the flat amplitude spectrum seismic signal 355.

The notches 330, 370 may result in resolution loss in the acquired seismic data. Thus, over/under combination technique attempts to estimate the up-going and down-going wave fields 310, 350 and 320, 360 by combining the "over" recorded data 325 and the "under" recorded data 365. For example, the up-going wave field 350 and a down-going wave field 360 of the deep streamer 210(2) are separated by a different time lag than the up-going wave field 310 and the down-going wave field 320 of the shallow streamer 210(1). The location of the notches 330, 370 depends on the depth of the streamers 210(1-2) and, consequently, the frequencies of the notches 370 are different than the frequencies of the notches 330. This property may be used to combine the "over" and "under" recorded data 325, 365 to reduce the effect of the notches 330, 370 in the combined data set.

However, conventional over/under data processing techniques do not account for variations in acquisition parameters, acquisition perturbations, sea height and non-ideal reflectivity, noise, streamer positioning errors, and the like that may reduce the quality of the over/under combination. For example, conventional techniques typically assume a nominal acquisition geometry in which the seismic cables are at a constant depth and are deployed precisely above one another. For another example, one conventional technique further assumes that the sea surface is a flat perfect reflector and applies the corresponding flat sea boundary condition to separate the up-going and down-going wave fields 310, 320, 350, 360, e.g. this conventional over/under data processing technique assumes boundary conditions corresponding to a surface reflectivity of −1 and a 180° phase difference between the up-going and down-going wave fields 310, 320, 350, 360.

In some conventional over/under data processing techniques, the "over" recorded data 325 may be combined with the "under" recorded data 365 during post-stack processing of the seismic data. In this embodiment, the over/under combination assumes vertical propagation of the various seismic signals. Stacking the recorded data 325, 365 typically applies a normal-move-out correction to bring the seismic signals to a common midpoint. However, assuming vertical propagation and/or applying the normal-move-out correction and stacking may not account for spatial and/or temporal variations in water velocity, ghost travel times, sea-bottom geometry, and the like. These assumptions can therefore reduce the quality of the over/under combination.

The present invention is directed to addressing the effects of one or more of the problems set forth above.

SUMMARY OF THE INVENTION

In one embodiment of the present invention, a method is provided for pre-stack combining of over/under seismic data. The method includes determining a calibration filter using a first pre-stack marine seismic data set acquired at a first depth and a second pre-stack marine seismic data set acquired at a second depth, wherein the second depth is greater than the first depth and determining a third data set based upon the first pre-stack marine seismic data set, the second pre-stack marine seismic data set, and the calibration filter. An article comprising one or more machine-readable storage media containing instructions that when executed enable a computer to perform the method, a computer programmed to perform the method, and an article comprising one or more machine-readable storage media containing data structures and data formed by the method are also provided.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
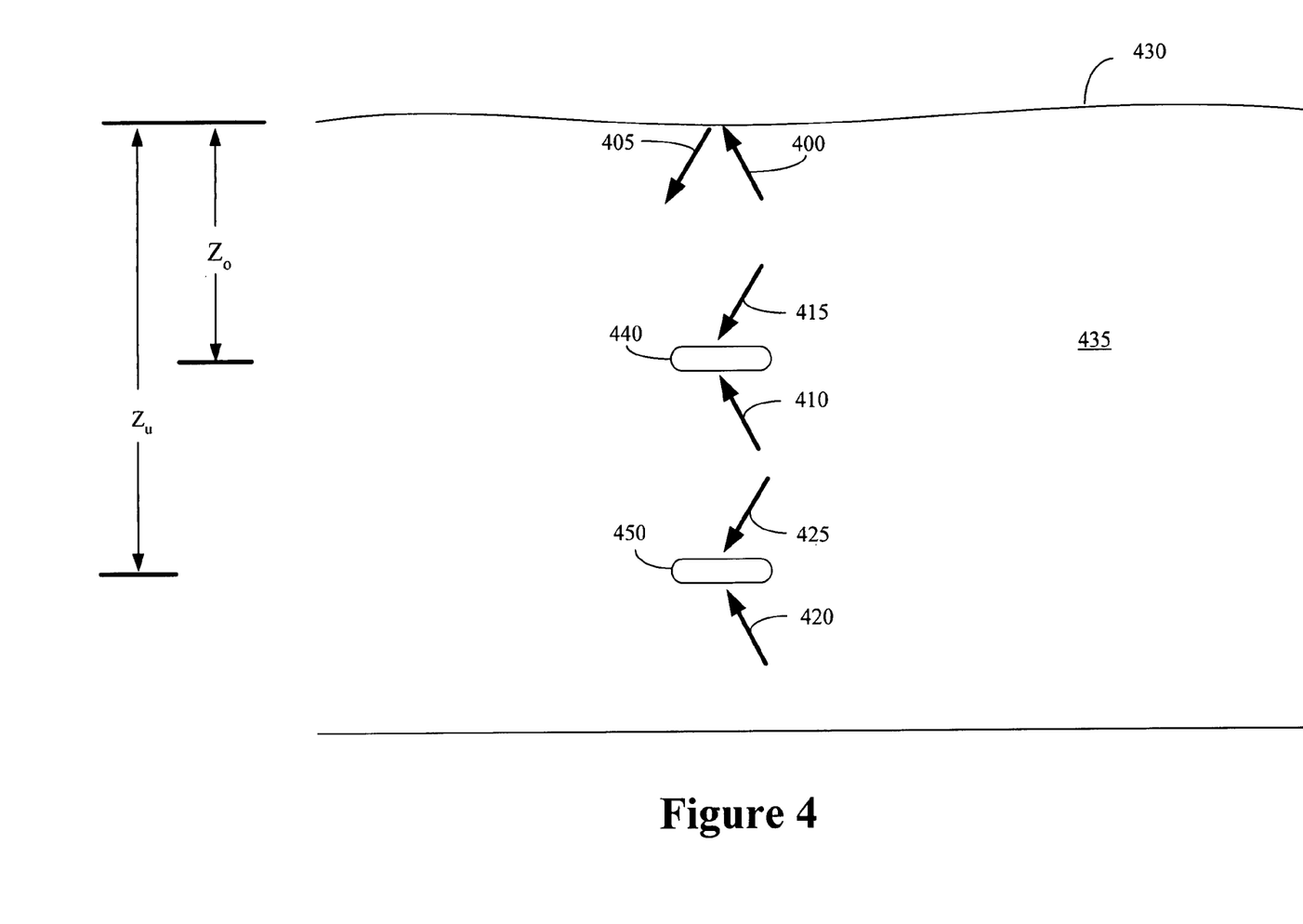
FIG. 4 conceptually illustrates over and under wave fields corresponding to at least one provided acoustic signal, or shot, in a marine seismic survey.

FIG. 4 conceptually illustrates up-going and down-going wave fields 400, 405, 410, 415, 420, 425 corresponding to at least one provided acoustic signal, or shot, in a marine seismic survey. Although the up-going and down-going wave fields are discussed herein as if they are separate entities, persons of ordinary skill in the art should appreciate that the up-going and down-going wave fields 400, 405, 410, 415, 420, 425 may represent portions of a single wave field produced by a single shot or portions of a plurality of wave fields produced by a plurality of shots.

An "over" seismic sensor 440 is deployed at a depth $Z_o$ beneath a surface 430 of a body of water 435 and an "under" seismic sensor 450 is deployed at a depth $Z_u$ beneath the surface 430. The "over" seismic sensor 440 detects one or more physical quantities indicative of the up-going and down-going wave fields 410, 415. In one embodiment, the "over" seismic sensor 440 detects a pressure wave field $P(Z_o)$ at the location of the "over" seismic sensor 440. The "under" seismic sensor 450 detects one or more physical quantities indicative of the up-going and down-going wave fields 420, 425. In one embodiment, the "under" seismic sensor 450 detects a pressure wave field $P(Z_u)$ at the location of the "under" seismic sensor 450.

The up-going wave field 420 at the "under" seismic sensor 450, represented by $U(Z_u)$, can be related to the pressure wave fields $P(Z_o)$ at the location of the "over" seismic sensor 440 and $P(Z_u)$ at the location of the "under" seismic sensor 450 by the expression:

$$U(Z_u) = \frac{W_D P(Z_u) - P(Z_o)}{W_D - W_U},$$

where $W_D$ and $W_U$ are wave field extrapolator operators for the down-going and up-going wave fields, respectively. Similarly, the down-going wave field 425 at the "under" seismic sensor 450, represented by $D(Z_u)$, can be related to the pressure wave fields $P(Z_o)$ and $P(Z_u)$ by the expression:

$$D(Z_u) = \frac{P(Z_o) - W_U P(Z_u)}{W_D - W_U}.$$

In one embodiment, the wave field extrapolator operator $W_U$ is given by the expression:

$$W_U = e^{-j2\pi f \sqrt{1-k^2 v^2/f^2}(Z_o - Z_u)}$$

and the wave field extrapolator operator $W_D$ is given by the expression:

$$W_D = e^{j2\pi f \sqrt{1-k^2 v^2/f^2}(Z_u - Z_o)},$$

where v is the water velocity, f is the wave frequency, and k is the wave number. Persons of ordinary skill in the art should appreciate that the expression for the wave field extrapolators is only valid for non-evanescent waves, i.e. $1-k^2v^2/f^2>0$. Persons of ordinary skill in the art should also appreciate that similar expressions may be derived to relate the up-going and down-going wave fields 410, 415 at the "over" seismic sensor 440 to the pressure wave fields $P(Z_o)$ and $P(Z_u)$.

The up-going wave field 400 just beneath the surface 430 is given by the expression:

$$U(0) = U(Z_u) e^{-j2\pi f \sqrt{1-k^2 v^2/f^2}(Z_u)},$$

and the down-going wave field 405 just beneath the surface 430 is given by the expression:

$$D(0) = D(Z_u) e^{j2\pi f \sqrt{1-k^2 v^2/f^2}(Z_u)}.$$

The above expressions for the up-going and down-going wave fields 400, 405 assume that the seismic source 215 is at the water surface 430 and that the water surface is at Z=0.

If the surface 430 is assumed to be perfectly calm, a circumstance that is virtually never achieved in practice, then the up-going and the down-going wave fields 400, 405 at the surface 430 are equal in absolute value and have opposite signs. In mathematical terms, the surface 430 is considered a free surface at which a pressure wave field vanishes, i.e. P(Z=0)=0 in a data window below the source direct arrival, so that the up-going and down-going wave fields 400, 405 are related by a flat sea boundary condition:

$$P(Z=0) = U(0) + D(0) = 0.$$

By imposing the flat sea boundary condition in the form U(0)=−D(0), i.e. a surface reflectivity of −1, for a data window below a direct source arrival, the following expression may be derived:

$$P(Z_o)\left[e^{j2\pi f \sqrt{1-k^2 v^2/f^2}\, Z_u}\left(1 - e^{-j2\pi f \sqrt{1-k^2 v^2/f^2}\, Z_u}\right)\right] = P(Z_u)\left[e^{j2\pi f \sqrt{1-k^2 v^2/f^2}\, Z_o}\left(1 - e^{-j2\pi f \sqrt{1-k^2 v^2/f^2}\, Z_o}\right)\right].$$

Persons of ordinary skill in the art should appreciate that the expressions in brackets are ghost operators, $F_O$ and $F_U$, for the over and under seismic data, respectively, in the case of a perfectly calm surface 430. Accordingly, the above expression states that the pressure at the "over" seismic receiver 440 multiplied by the ghost operator $F_U$ of the "under" seismic receiver 450 is equal to the pressure at the "under" seismic receiver 450 multiplied by the ghost operator $F_O$ of the "over" seismic receiver 440. In mathematical terms, the above expression may be written in the simplified form: $P(Z_o)F_U = P(Z_u)F_O$.

However, as discussed above, the surface 430 is virtually never flat, as assumed above. Moreover, the above expressions do not account for temporal and spatial variations in the water velocity, reflectivity of the surface 430, streamer positioning errors, and other non-ideal conditions that are frequently encountered in real marine seismic surveys. To account, at least in part, for the effects of the aforementioned non-ideal conditions, one or more calibration filters are determined in a manner that will be discussed in detail below. The calibration filters are then used to form an over/under combination of marine seismic data acquired by the "over" seismic receiver 440 and the "under" seismic receiver 450. For example, the over/under combination may be formed by modifying the "over" data using the one or more calibration filters. The over/under combination formed with the modified "over" data may result in a combined data set with reduced noise relative to a data set formed by an over/under combination using the recorded "over" data.

Figure 5:
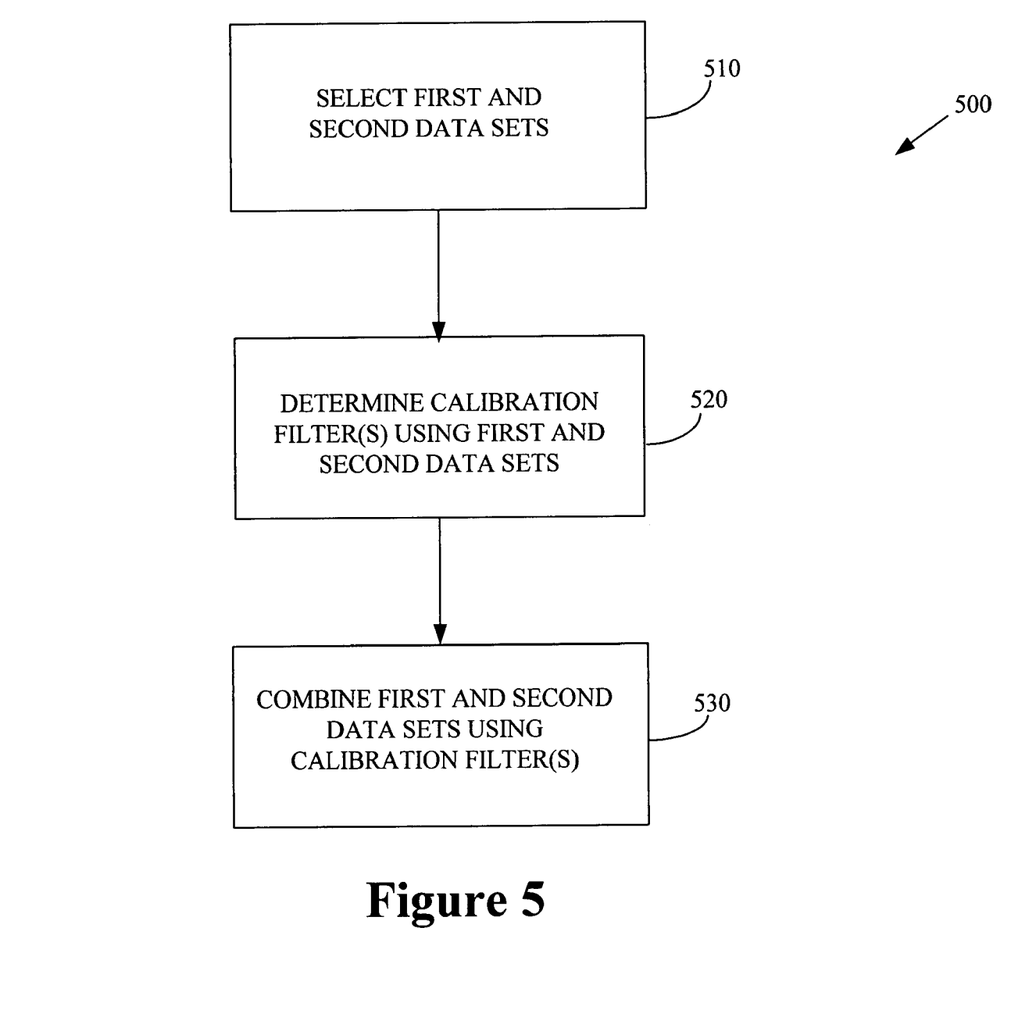
FIG. 5 conceptually illustrates one embodiment of a method for forming an over/under combination using one or more calibration filters.

FIG. 5 conceptually illustrates one embodiment of a method 500 for forming an over/under combination using one or more calibration filters. First and second data sets are selected (at 510). In one embodiment, the first and second data sets are selected (at 510) to be pre-stack over and under data sets acquired by at least one seismic sensor coupled to an "over" streamer and at least one seismic sensor coupled to an "under" streamer in an over/under streamer combination. However, the present invention is not limited to selecting (at 510) all of the data in the pre-stack data set. In one alternative embodiment, portions of the pre-stacked data set acquired within a selected time window and/or a selected offset window may be selected (at 510). In another alternative embodiment, portions of the pre-stacked data set from a selected gather, such as a shot gather and/or a receiver gather, may be selected (at 510).

The first and/or second data sets may be provided via transmission over a wired and/or wireless medium. For instance, the over and under data sets may be selected from the data as it is gathered, or shortly after it is collected, from a seismic survey. Alternatively, the first and/or second data sets may be recorded on and transmitted via recording tape, magnetic disks, compact disks, DVDs, and the like. Thus, the first and second data sets can, in some embodiments, be selected from data previously collected and archived on some magnetic or optical storage medium.

One or more calibration filters are determined (at 520) using the selected over and under data sets. In one embodiment, the one or more calibration filters are determined (at 520) by initially assuming, as discussed above, the pressure at the "over" seismic receiver 440 multiplied by the ghost operator $F_U$ of the "under" seismic receiver 450 is equal to the pressure at the "under" seismic receiver 450 multiplied by the ghost operator $F_O$ of the "over" seismic receiver 440, i.e. $P(Z_o)F_U = P(Z_u)F_O$. This technique is often referred to as across-ghosting technique.

However, as discussed above, this relationship generally is not precise for the acquired over/under seismic data. The one or more calibration filters, a(f), may therefore be determined using the expression $a(f)P(Z_o)F_U = P(Z_u)F_O$. For example, the one or more calibration filters may be determined by minimizing the difference between the left and right side of the expression $a(f)P(Z_o)F_U = P(Z_u)F_O$ by a least-squares criterion.

However, persons of ordinary skill in the art should appreciate that the present invention is not limited to applying the least-squares criterion to the expression $a(f)P(Z_o)F_U=P(Z_u)F_O$. In alternative embodiments, any desirable expression may be evaluated with any desirable technique used to determine the calibration filters. Persons of ordinary skill in the art should also appreciate that the one or more calibration filters may be determined such that the expression $a(f)P(Z_o)F_U=P(Z_u)F_O$ holds true in a statistical sense, even though it may not hold precisely for all the acquired seismic data used to determine the calibration filters.

The one more calibration filters are then used to combine (at 530) the first and second data sets to form a third data set, such as an over/under combined data set. In one embodiment, the one or more calibration filters are used to define perturbed over and under data sets. The perturbed data sets are then incorporated into a selected over/under combination technique (at 530). Persons of ordinary skill in the art should appreciate that the present invention is not limited to any particular technique for combining (at 530) the over and under seismic data using the one or more calibration filters. In various alternative embodiments, any desirable technique for combining (at 530) the over and under seismic data using the one or more calibration filters may be used.

By incorporating the one or more calibration filters into the over/under combination technique, the accuracy of the process seismic data may be improved. Moreover, this adaptive approach may be less sensitive to acquisition parameters, acquisition perturbations, water velocity variations, sea-surface reflectivity, and the like. For example, seismic data was acquired using three cables simultaneously towed at 5 m, 18 m, and 23 m in calm sea conditions. The up-going away field was estimated using an over/under combination of the 5 m and 18 m data and an over/under combination of the 18 m and 23 m data, as well as the flat sea boundary condition. If no perturbations were present, the estimated up-going wave field would be the same in both cases. However, the estimated up-going wave field for the over/under combination of the 5 m and 18 m data is different than the estimated up-going wave field for the over/under combination of the 18 m and 23 m data. When the method 500 was used to calibrate the seismic data and form the over/under combination of the 5 m and 18 m data and the over/under combination of the 18 m and 23 m data, the amplitude of the perturbations was noticeably reduced.

Figures 6A, 6B:
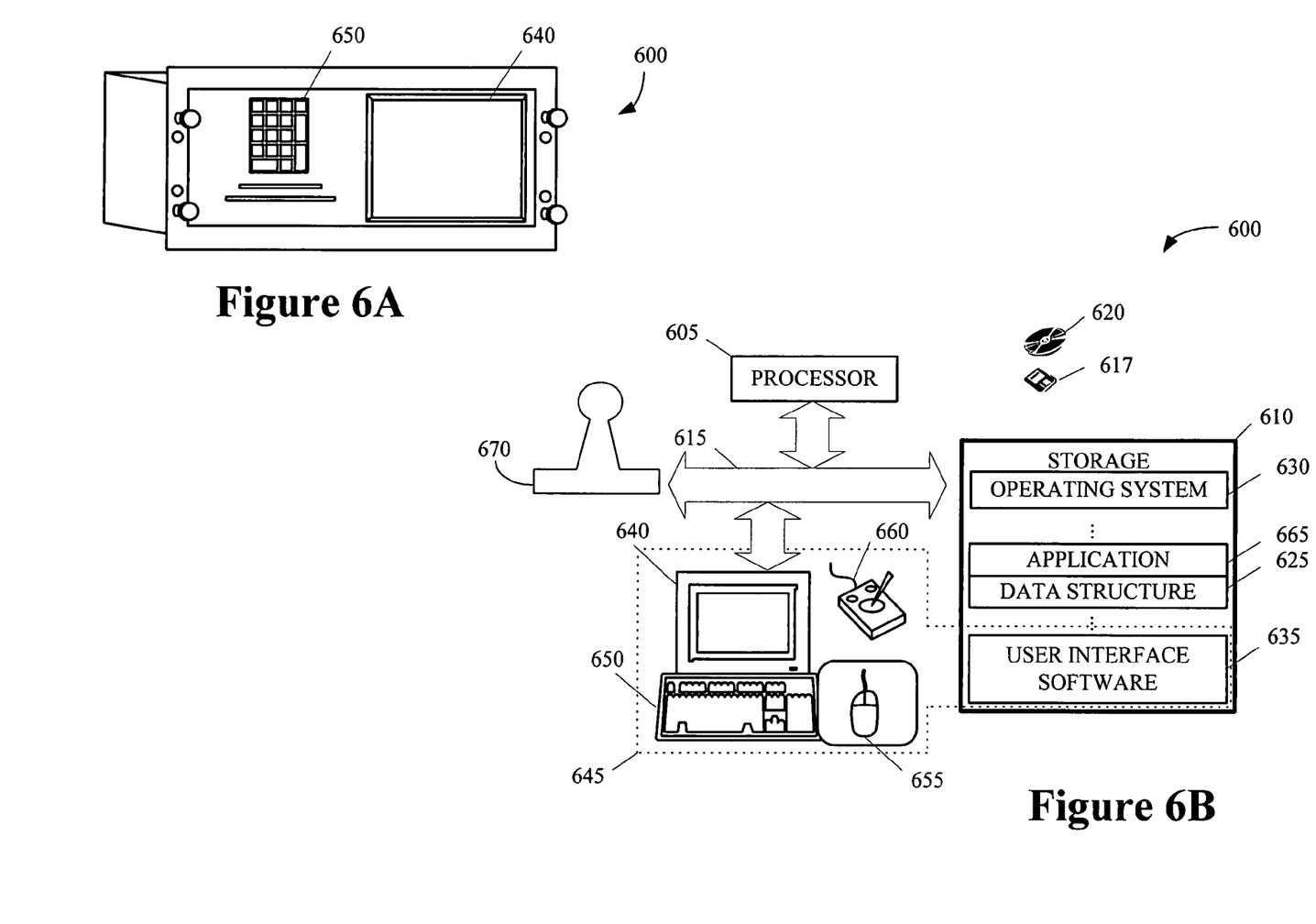
FIGS. 6A and 6B conceptually illustrate selected aspects of a computing apparatus that may be used to implement the method shown in FIG. 5.

FIGS. 6A and 6B show a computing apparatus 600 that may be used to perform the aforementioned operations. The computing apparatus 600 includes a processor 605 communicating with some storage 610 over a bus system 615. The storage 610 may include a hard disk and/or random access memory ("RAM") and/or removable storage such as a floppy magnetic disk 617 and an optical disk 620. The storage 610 is encoded with a data structure 625 storing the signals collected as discussed above, an operating system 630, user interface software 635, and an application 665. The user interface software 635, in conjunction with a display 640, implements a user interface 645. The user interface 645 may include peripheral I/O devices such as a key pad or keyboard 650, a mouse 655, or a joystick 660. The processor 605 runs under the control of the operating system 630, which may be practically any operating system known to the art. The application 665 is invoked by the operating system 630 upon power up, reset, or both, depending on the implementation of the operating system 630.

As discussed above, data collected during the marine seismic survey may be communicated to the computing apparatus 600 via any storage medium, including, but not limited to, recording tape, magnetic disks, compact disks, and DVDs. The data collected during the marine seismic survey may also be communicated directly to the computing apparatus 600 by, e.g., a satellite link 670, and stored in the storage 610. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:

determining a calibration filter using a first pre-stack marine seismic data set acquired at a first depth and a second pre-stack marine seismic data set acquired at a second depth, wherein the second depth is greater than the first depth, and accounting for non-ideal conditions departing from a flat sea approximation; and determining a third data set based upon the first pre-stack marine seismic data set, the second pre-stack marine seismic data set, and the calibration filter.

2. The method of claim 1, wherein determining the calibration filter using the first pre-stack marine seismic data set and the second pre-stack marine seismic data set comprises determining the calibration filter using first and second pressure wave fields.

3. The method of claim 1, wherein determining the calibration filter comprises determining the calibration filter using a cross-ghosting technique.

4. The method of claim 1, wherein determining the calibration filter comprises determining the calibration filter using a least-squares criteria.

5. The method of claim 1, wherein determining the calibration filter comprises determining the calibration filter using first and second pre-stack marine seismic data sets acquired within at least one of a selected time window, a selected offset window, a selected gather, a selected shot gather, and a selected receiver gather.

6. The method of claim 1, wherein determining the third data set comprises determining at least one of an up-going wave field and a down-going wave field using an over/under combination of the first and second pre-stack marine seismic data sets.

7. An article comprising one or more machine-readable storage media containing instructions that when executed enable a computer to:
   determine a calibration filter using a first pre-stack marine seismic data set acquired at a first depth and a second pre-stack marine seismic data set acquired at a second depth, wherein the second depth is greater than the first depth, and accounting for non-ideal conditions departing from a flat sea approximation; and
   determine a third data set based upon the first pre-stack marine seismic data set, the second pre-stack marine seismic data set, and the calibration filter.

8. The article of claim 7, wherein the one or more machine-readable storage media contain instructions that when executed enable a computer to determine the calibration filter using first second pressure wave fields.

9. The article of claim 7, wherein the one or more machine-readable storage media contain instructions that when executed enable a computer to determine the calibration filter using a cross-ghosting technique.

10. The article of claim 7, wherein the one or more machine-readable storage media contain instructions that when executed enable a computer to determine the calibration filter using first and second pre-stack marine seismic data sets acquired within at least one of a selected time window, a selected offset window, a selected gather, a selected shot gather, and a selected receiver gather.

11. The article of claim 7, wherein the one or more machine-readable storage media contain instructions that when executed enable a computer to determine at least one of an up-going wave field and a down-going wave field using an over/under combination of the first and second pre-stack marine seismic data sets.

12. An article comprising one or more machine-readable storage media containing data structures and data formed by:
   determining a calibration filter using a first pre-stack marine seismic data set acquired at a first depth and a second pre-stack marine seismic data set acquired at a second depth, wherein the second depth is greater than the first depth, and accounting for non-ideal conditions departing from a flat sea approximation; and
   determining a third data set based upon the first pre-stack marine seismic data set, the second pre-stack marine seismic data set, and the calibration filter.

13. The article of claim 12, comprising one or more machine-readable storage media containing data structures and data formed by determining the calibration filter using first second pressure wave fields.

14. The article of claim 12, comprising one or more machine-readable storage media containing data structures and data formed by determining the calibration filter using a cross-ghosting technique.

15. The article of claim 12, comprising one or more machine-readable storage media containing data structures and data formed by determining the calibration filter using first and second pre-stack marine seismic data sets acquired within at least one of a selected time window, a selected offset, a selected gather, a selected shot gather, and a selected receiver gather.

16. The article of claim 12, comprising one or more machine-readable storage media containing data structures and data formed by determining at least one of an up-going wave field and a down-going wave field using an over/under combination of the first and second pre-stack marine seismic data sets.

17. A computer programmed to:
   determine a calibration filter using a first pre-stack marine seismic data set acquired at a first depth and a second pre-stack marine seismic data set acquired at a second depth, wherein the second depth is greater than the first depth, and accounting for non-ideal conditions departing from a flat sea approximation; and
   determine a third data set based upon the first pre-stack marine seismic data set, the second pre-stack marine seismic data set, and the calibration filter.

18. The computer of claim 17 programmed to determine the calibration filter using first and second pre-stack marine seismic data sets acquired within at least one of a selected time window, a selected offset, a selected gather, a selected shot gather, and a selected receiver gather.

19. The computer of claim 17 programmed to determine at least one of an up-going wave field and a down-going wave field using an over/under combination of the first and second pre-stack marine seismic data sets.

* * * * *